United States Patent [19]
Costa et al.

[11] Patent Number: 5,822,417
[45] Date of Patent: Oct. 13, 1998

[54] PHONE CONTROL CENTER FOR A LIFE SAFETY NETWORK

[75] Inventors: Hilario S. Costa; Andrew Novetzke; Michael K. Slack, all of Sarasota, Fla.

[73] Assignee: General Signal Corporation, Stamford, Conn.

[21] Appl. No.: 644,835

[22] Filed: May 10, 1996

[51] Int. Cl.$^6$ .................................................. H04M 13/00
[52] U.S. Cl. ......................... 379/177; 379/142; 379/183; 379/187
[58] Field of Search .................................. 379/130, 140, 379/142, 177, 37, 43, 182, 183, 187

[56] References Cited

U.S. PATENT DOCUMENTS

| | | |
|---|---|---|
| 4,673,920 | 6/1987 | Ferguson et al. . |
| 5,283,818 | 2/1994 | Klausner et al. ........................ 379/142 |
| 5,398,279 | 3/1995 | Frain ........................................ 379/142 |
| 5,446,785 | 8/1995 | Hirai ........................................ 379/142 |

*Primary Examiner*—Curtis A. Kuntz
*Assistant Examiner*—Duc Nguyen
*Attorney, Agent, or Firm*—Ohlandt, Greeley, Ruggiero & Perle

[57] ABSTRACT

There is provided a phone control system for a life safety network which comprises a panel arrangement, a control center module, a loop controller module, a transponder and a remote handset. The panel arrangement has a local rail for receiving a plurality of control modules and for interconnecting the control modules in which inter-module data is transmitted and received along the local rail. The control center module and the loop controller module are control modules positioned on the local rail. The control center module includes a processor, a memory portion, input keys for receiving user input, an output screen for displaying alpha-numeric text output, a central handset for communication of voice messages along a voice communication line. Similarly, the loop controller module includes a processor, a memory portion, and a data line interface for receiving and transmitting loop controller signals along a loop controller line. The transponder and remote handset are position remote from the panel arrangement. The transponder is connected to the loop controller line to transmit and receive the loop controller signals and, they are also connected to the voice communication line for communication of the voice messages along the voice communication line. In addition, the transponder is connected to the remote handset.

19 Claims, 6 Drawing Sheets

| LINE | | |
|---|---|---|
| 1 | ## CALLS PENDING | 102 |
| 2 | PENDING CALL SCROLL LINE | 104 |
| 3 | # CALLS CONNECTED | 106 |
| 4 | CONNECTED CALL #1 | 108 |
| 5 | CONNECTED CALL #2 | 110 |
| 6 | CONNECTED CALL #3 | 112 |
| 7 | CONNECTED CALL #4 | 114 |
| 8 | CONNECTED CALL #5 | 116 |

| LINE | | |
|---|---|---|
| 1 | 0 CALLS PENDING | 102 |
| 2 | EMERGENCY | 104 |
| 3 | TELEPHONE | 106 |
| 4 | SYSTEM | 108 |
| 5 | | 110 |
| 6 | | 112 |
| 7 | | 114 |
| 8 | | 116 |

PHONE CONTROL CENTER FOR A LIFE SAFETY NETWORK

RELATED APPLICATIONS

The invention of this application is related to inventions described in five other applications with reference to the same life safety network that are owned by the assignee of the present invention: U.S. patent application Ser. No. 08/644,479 filed on May 10, 1996 entitled Life Safety System Having a Panel Network With Message Priority (Docket No. 100.0607); U.S. patent application Ser. No. 08/644,834 filed on May 10, 1996 entitled Audio Communication System for a Life Safety Network (Docket No. 100.0608); U.S. patent application Ser. No. 08/644,816 filed on May 10, 1996 entitled Automatic Addressing in Life Safety System (Docket No. 100.0610); U.S. patent application Ser. No. 08/644,478 filed on May 10, 1996 entitled Configuration Programming System for a Life Safety Network (Docket No. 100.0611); and U.S. patent application Ser. No. 08/644,815 filed on May 10, 1996 entitled Core Modules for a Life Safety System and Structure for Supporting Such Modules in a Panel Housing (Docket No. 100.0612).

BACKGROUND OF THE INVENTION

I. Field of the Invention

The present invention relates generally to communication systems for life safety networks that control audio communications between two or more locations in such networks. More particularly, the present invention relates to a voice communication system that enables a user at a particular location to control and coordinate incoming calls from a plurality of remote locations.

II. Description of the Prior Art

Life safety networks having microprocessor-based components distributed throughout the network are known. For such networks, intelligence is distributed so that each microprocessor-based component may act independently when other components cannot response and/or more efficiently when other components are not capable of responding quickly. Generally, such life safety networks include a plurality of panel arrangements connected by communication lines in which each panel arrangement monitors and controls the components located in a particular local region. In addition, each panel arrangement monitors and controls a subgroup of components located in a particular zones of coverage. For example, a life safety network for a group of buildings may include a panel arrangement situated on the main floor of each building and a subgroup of components located on each floor of each building. Thus, each panel arrangement would cover a particular building and each subgroup would cover a particular floor.

The various components of a life safety network include input devices, output devices and control devices. Input devices include sensing hardware that detects life safety-related conditions, such as smoke, gas or heat, and initiating devices, such as dry contact type devices, that are used to monitor pull stations, doors and dampers. Output devices include horns, bells, and speakers that notify personnel of a potentially life threatening conditions and relay devices that activate door closers, fans, and elevators. Of course, the functions of both input and output devices may be combined within a single device, thus being an input/output device. Control devices are equipment that monitor input devices for their changes of state and control output devices based, in part, on response signals received from input devices. Each input, output, input/output and control device is assigned a unique identifier or address.

Life safety networks typically include a communication system that allows two-way voice communication between a panel arrangement and one or more zone of coverage. The subgroup of components located in each zone of coverage includes at least one handset, or a connection for a portable handset, for communication to its respective panel arrangement. Similarly, each panel arrangement has a phone control center that includes a handset and a control panel for coordinating incoming calls from its respective zones of coverage.

The control panel of conventional phone control centers have single light emitting diodes ("LEDs") and switches for each zone of coverage. Since each zone of coverage must have a corresponding LED and switch, controlling and coordinating incoming calls from the zones is cumbersome and inefficient. This problem is a particular concern for life safety personnel since time is of the essence during emergency situations. In addition, the installation and configuration of the LEDs and switches for each control panel of the life safety network is time-consuming and expensive, due to the fact that each control panel must be customized with the correct number of LEDs and switches. Similarly, LEDs and switches must be added or removed every time a handset or handset connection is added or removed from a particular zone of coverage.

Against the foregoing background, it is a primary object of the present invention to provide a low cost, easy to use phone control system for voice communications on a life safety network.

It is another object of the present invention to provide such a phone control system that is simple and economical to install in a panel arrangement of the life safety system.

It is a further object of the present invention to provide such a phone control system that is simple and economical to re-configure when a handset or handset connection is added or removed from a subgroup of components located in a particular zone of coverage.

It is still further object of the present invention to provide such a phone control system in which a plurality of incoming calls received by the system may be placed on a party line for group conferencing.

SUMMARY OF THE INVENTION

To accomplish the foregoing objects and advantages, the present invention is a phone control system for a life safety network which, in brief summary, comprises a panel arrangement, a phone control center module, a loop controller module and a remote means for communicating voice messages. The panel arrangement has a local rail for receiving a plurality of control modules and for interconnecting the control modules. Also, each of the control modules has means for transmitting and receiving inter-module data along the local rail. The phone control center module is a control module positioned on the local rail and includes means for storing executable code, means for processing the executable code, input keys for receiving user input, an output screen for displaying alpha-numeric text output, a central handset for communication of voice messages along a voice communication line. The loop controller module is another control module positioned on the local rail and includes means for storing executable code, means for processing the executable code, and a data line interface for receiving and transmitting loop controller signals along a loop controller line. The remote means for transmitting and receiving the loop controller signals is remote from the panel arrangement. In addition, the remote means is connected to the loop controller line and the voice communication line and includes a remote handset for communication of the voice messages along the voice communication line.

BRIEF DESCRIPTION OF THE DRAWINGS

The foregoing and still further objects and advantages of the present invention will be more apparent from the following detailed explanation of the preferred embodiments of the invention in connection with the accompanying drawings.

FIG. I is a block diagram of the preferred embodiment of the present invention that is integrated in a life safety network.

DETAILED DESCRIPTION OF THE PREFERRED EMBODIMENT

A life safety network includes groups or local area networks ("LANs") of intelligent devices in which each group monitors the safety conditions in a particular local region, such as an entire building or a portion thereof. In particular, the life safety system includes a plurality of central processing units ("CPUs") that are linked in series by CPU-to-CPU communication lines. Each CPU controls CPU-to-CPU communications and monitors the environment of a particular region to determine whether conditions in the zone are safe.

In order for the CPUs to monitor and control the safety operations in their respective region, each CPU is networked to a variety of I/O hardware modules or local rail modules ("LRMs") by a plurality of local communication lines. In each region, the LRMs provide the CPU with information relating to the safety conditions throughout the region and assist the CPU in distributing warning signals and messages to the occupants in the region. The CPU is always a master device on the local rail and, thus, may communicate with any LRM connected to the local communication lines. Also, the CPUs and certain LRMs include programmable memory that may be configured for specific life safety functions and operations. For example, the programmable memory portion of an audio source module or unit ("ASU") may be configured to broadcast warning signals and instructions during emergency situations.

Figure 1:
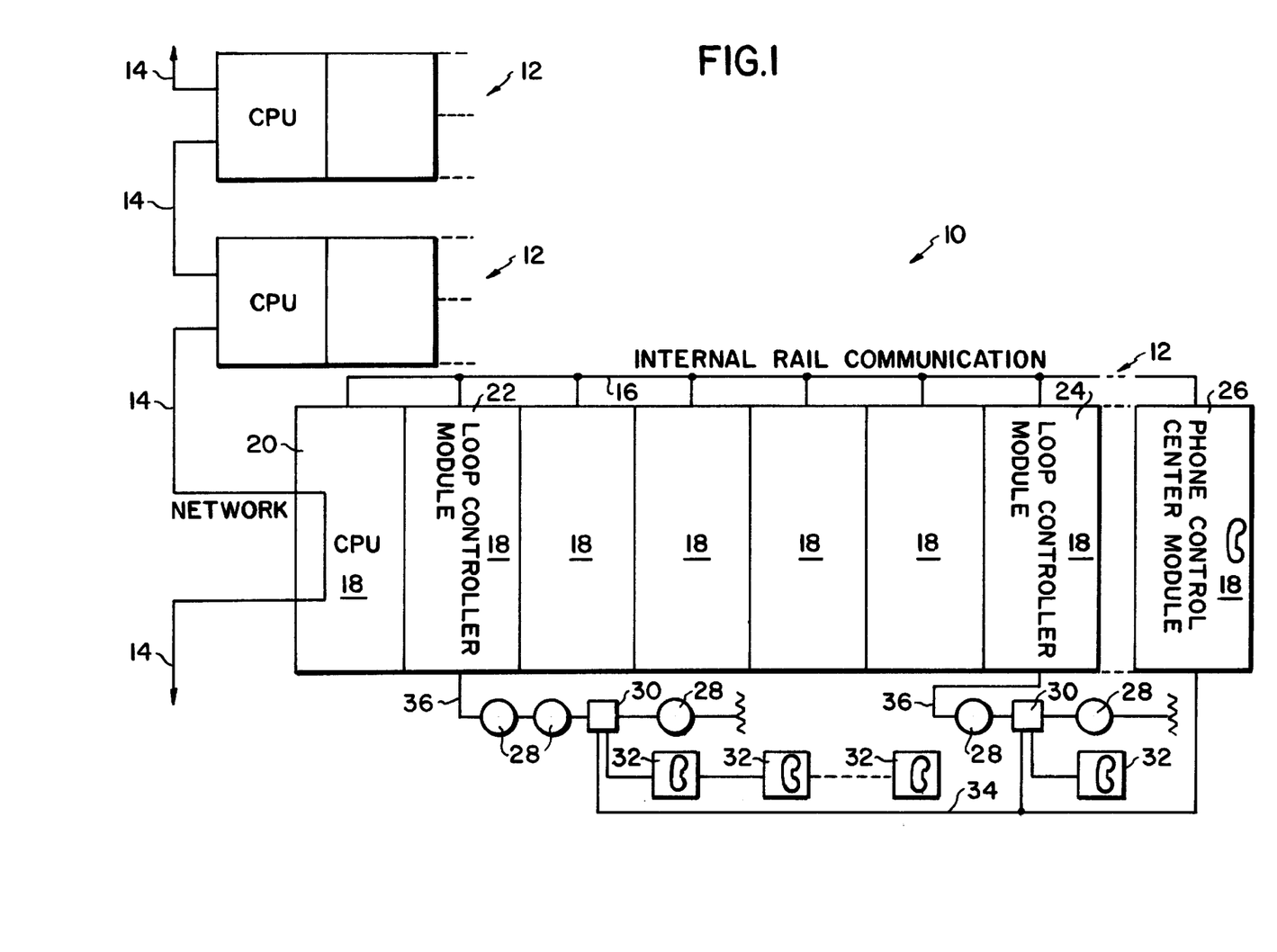

Referring to the drawings and, in particular, to FIG. 1, there is shown a life safety network at a central station or the like which is generally represented by reference numeral 10.

The life safety network 10 comprises a series of panel arrangements 12 connected by panel-to-panel communication lines 14. As shown in FIG. 1, the LRMs 24 are interconnected by a local rail 16 for inter-module communications. Each panel arrangement 12 includes one or more LRMs 18, such as the CPU 20, first loop controller module ("first LPC") 22, second loop controller ("second LPC") 24, phone control center module 26 and other LRMs shown in FIG. 1. Other types of LRMs 18 may be used in the panel arrangements 12 including, but are not limited to, a power supply module, traditional I/O zone module, reverse polarity module, audio source module and audio amplifier module.

In addition, the first and second LPCs 22, 24 may be connected to a plurality of devices, such as a plurality of smoke detectors 28 and a transponder 30. One or more handsets 32 extend from the transponders 30. Such handsets 32 are similar to those used for telephones and, thus, include an speaker positioned within an earpiece at one end and a microphone positioned within a mouthpiece at the other end. For the preferred embodiment, one transponder and a respective handset is located at each zone of coverage, such as a single floor of a building, monitored by each panel arrangement 12.

The phone control center module 26 will be the single master point of control for all voice communication signals. The control center module 26 has the capability of selecting from a plurality of incoming calls, preferably up to five call-in requests, and allows party line type communications among the handsets that are sending the incoming calls and the master. Thus, the phone control center module 26 provides a user with complete control and status information at one central location, i.e., the panel arrangement 12.

As shown in FIG. 1, there is also a voice communication line connecting the phone control center module 26 to the transponders 30. Thus, there are two routes of communication between each transponder 30 and the phone control center module 26. For the first route, command data or loop controller signal, preferably in digital form, is transferred through a loop controller line 36 to the loop controller 22. The loop controller, in turn, transfers this command data to the phone control center module 26 via the local rail 16. For the second route, voice communication signals, preferably in analog form, are transmitted to the phone control center module 26 via the voice communication line 34. Of course, for both the first route and the second route, the phone control center module 26 may send command data in the reverse direction to the transponder 30. For the preferred embodiment, instructions and commands are communicated through the first route and audio or voice messages are communicated through the second route.

Figure 2:
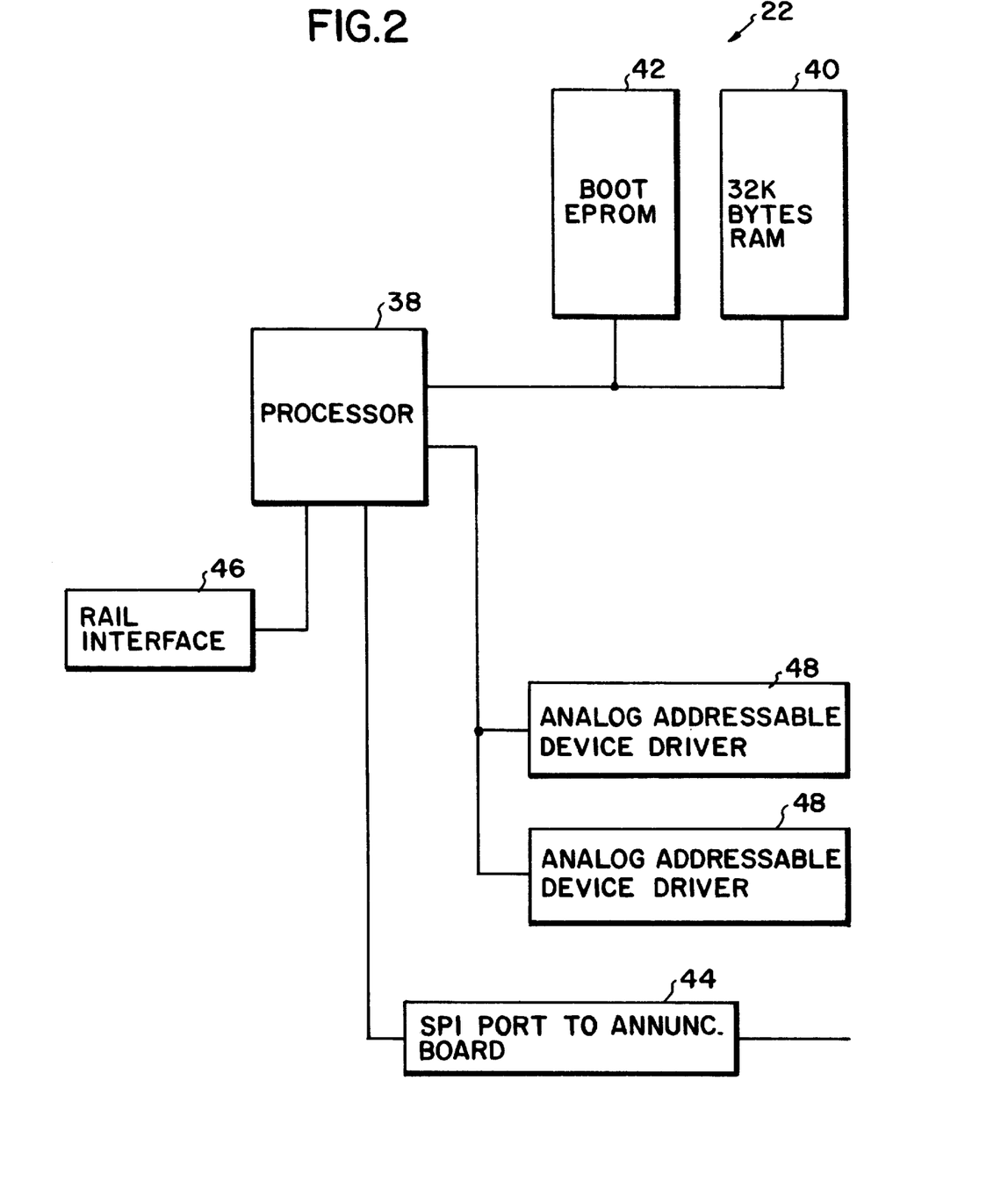
FIG. 2 is a block diagram of one of the two loop controller modules of FIG. 1.

Referring to FIG. 2, each loop controller 22 includes a processor 38, random access memory ("RAM") 40 and erasable programmable read only memory ("EPROM") 42. Thus, the loop controllers 22 are programmable control modules that may be easily configured and updated by downloading information to its memory portions 40, 42 via port 44. Each loop controller 22 also includes a rail interface 46 for connection to the local rail 16, and two drivers 48 for sending and receiving loop controller data to and from the plurality of devices along the loop controller line 36, such as the smoke detectors 28 and the transponder 30.

It is to be understood that the present invention may utilize a wide variety of different transponders 30 to form the connection between the loop controller module 22 and the handsets 32. For example, one type of transponder is set forth in U.S. patent application titled FIELD PROGRAM- MABLE MODULE PERSONALITIES, filed on May 16, 1995 and assigned Ser. No. 08/441,792, which application is owned by the assignee of the present invention. This co-pending application is incorporated herein by reference.

Figure 3:
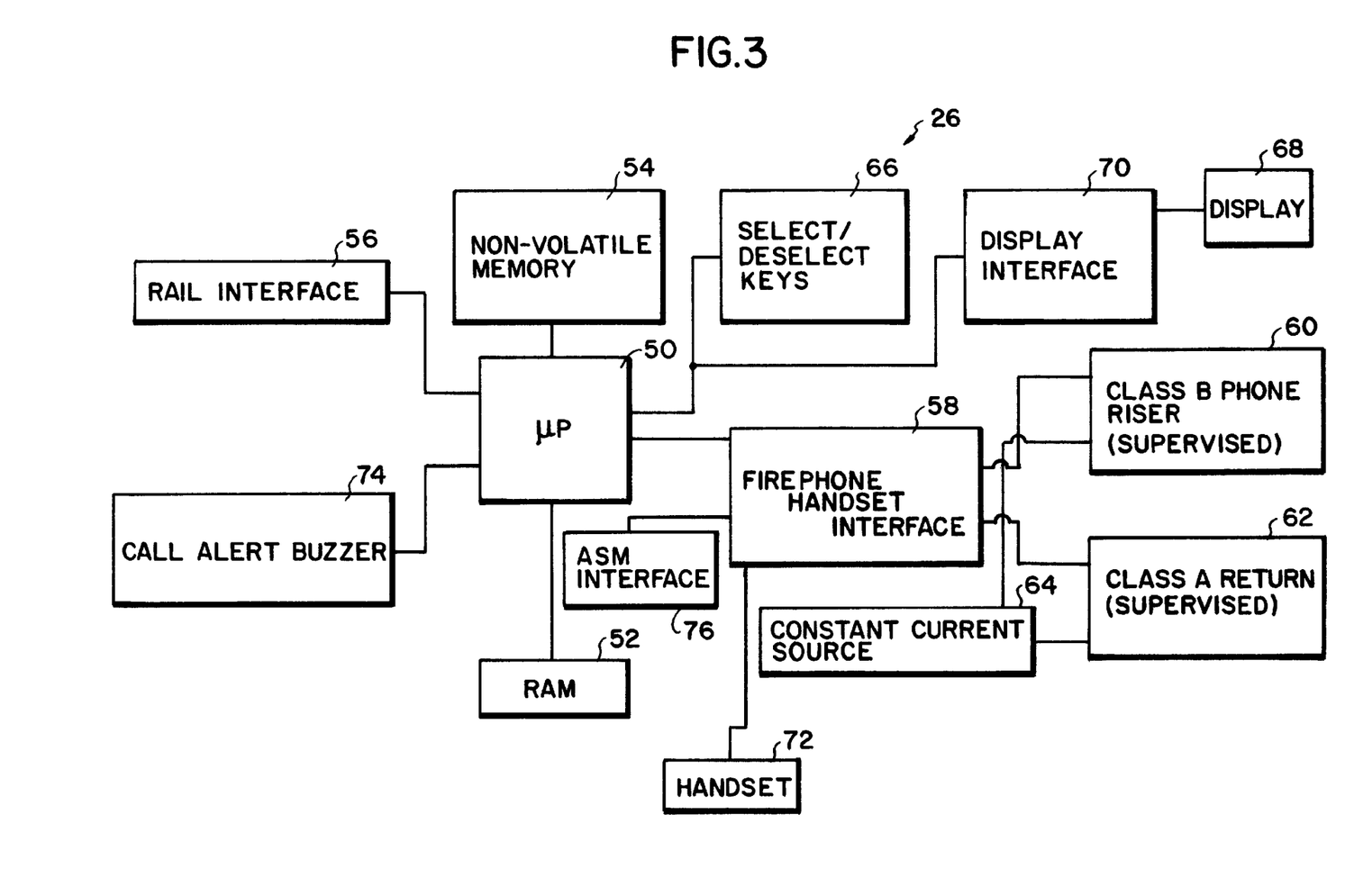
FIG. 3 is a block diagram of the phone control center module of FIG. 1.

Referring to FIG. 3, the phone control center module 26 includes a processor 50 (preferably a microprocessor), RAM 52, and non-volatile memory 54. Thus, similar to the loop controllers 22, the phone control center module 26 is a programmable control module that may be easily configured and updated by downloading information to its RAM 52 and non-volatile memory 54. Such downloaded information may be received from the local rail 16 via a local rail interface 56, for example an RS-4826 port, or an external serial port (not shown). The phone control center module 26 also includes a handset interface 58 connected to the processor 50, a class B phone rises 60 (supervised) and class A return 62 (supervised) connected to the handset interface, and a constant current source 64 feeding into the phone riser and return. The phone riser 60 and the return 62 transmit and receive voice communication data via the voice communication line 34. Due to the current source 64, the phone riser is a balanced constant current source for noise immunity.

To download instruction or software data to the loop controller 22 and/or the phone control center module 26, the present invention may utilize any type of system that may provide such data through a standard digital interface. For example, one example of a system for downloading software is set forth in co-pending U.S. patent application Ser. No. 08/644,478 filed on May 10, 1996 entitled Configuration Programming System for a Life Safety Network (Docket No. 100.0611), which application is owned by the assignee of the present invention and has been cited above. This co-pending application is incorporated herein by reference.

For interaction with the user, the control center module 26 includes select/deselect touch keys 66, a visual display 68 such as an LCD screen connected to the processor 50 by a display interface 70, and a handset 72 connected to the processor by the handset interface 58. Accordingly, a user may communicate with handsets at remote locations or zones by speaking and listening through the handset 72, and determine the connections for incoming calls by viewing display 68 and operating touch keys 66.

A call alert buzzer 74 of the control center module 26 will generate an audible sound to indicate to the user that a call has come in. Also, an audio source module or unit ("ASU") interface 76 of the control center module 26 may be connected to the audio communication system (not shown) of the panel arrangement 12. One type of audio communication system that may be used for the present invention is set forth in co-pending U.S. patent application Ser. No. 08/644,834 filed on May 10, 1996 entitled Audio Communication System for a Life Safety Network (Docket No. 100.0608), which application is owned by the assignee of the present invention and was cited above. This co-pending application is incorporated herein by reference.

Figure 4:
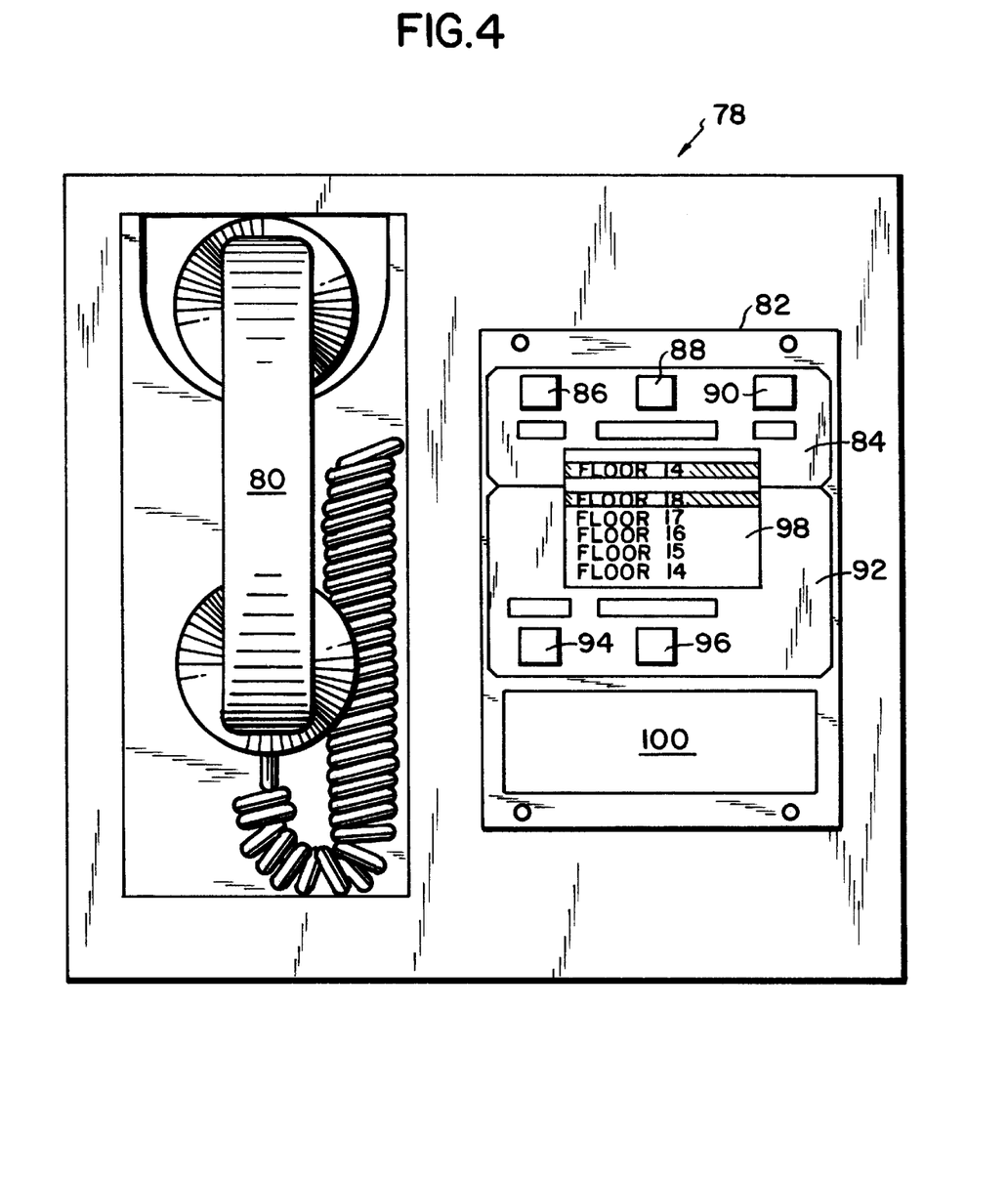
FIG. 4 is a front planar view of phone control center module of FIG. 3.

Referring to FIG. 4, the front cover 78 of the phone control center module 26 includes a central handset 80 and a control panel 82. The control panel 82 generally has four sections: a top section 84 having three touch buttons labeled "CONNECT" 86, "REVIEW PENDING" 88 and "ACK" 90, a middle portion 92 having two touch buttons labeled "DISCONNECT" 94 and "REVIEW CONNECTED" 96, a display window section 98 overlapping a portion of the top section and the middle section, and a bottom section 100 having an open space for instructions or messages. The bottom section 100 may be used to provide operating instructions for use of the control panel 78, including instructions in various languages depending upon the country where the life safety network 10 is being used. As shown in FIG. 4, the display window section 98 may display a plurality of lines of text. Although not shown in the drawings, each text line of the display window section 98 may be displayed using a different font or style to provide emphasis to certain lines and/or to distinguish the lines from each other.

Figure 5:
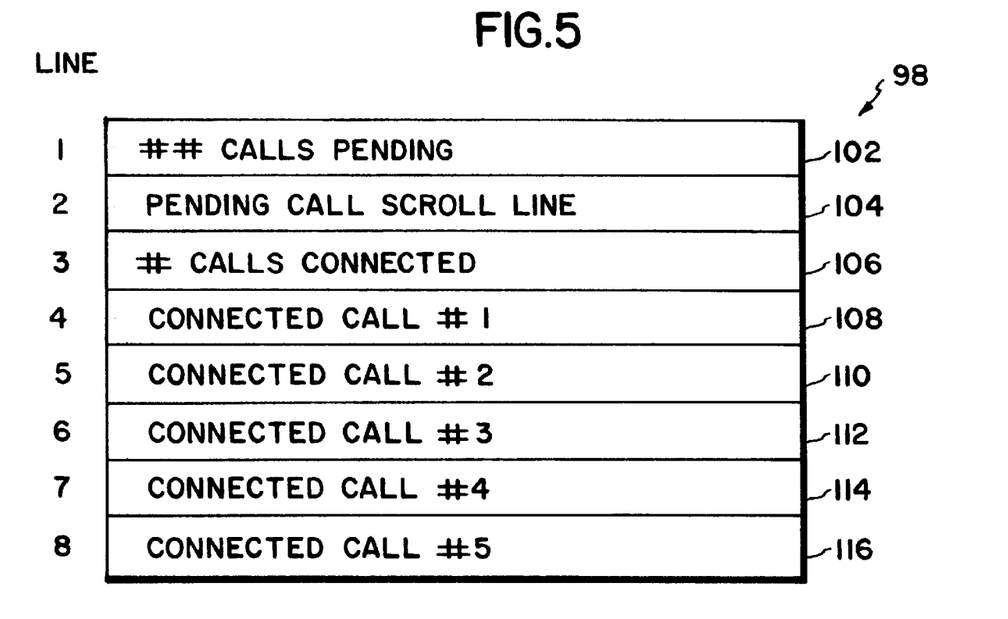
FIG. 5 is an enlarged view of the display of the control panel of FIG. 4 illustrating the general layout of the display.

Referring to FIG. 5, the general format or layout of the display 98 for the preferred embodiment has eight lines of text or messages. The first line 102 of the display 98 provides the number of incoming calls that are pending and are not connected to the central handset 80, and the third line 106 of the display provides the number of incoming calls that have been connected to the central handset. The second line 104 of the display 98 provides the originating location or zone of each pending calls, and the fourth through eighth line 108, 110, 112, 114 & 116 of the display 98 provide the originating location or locations of the connected calls.

During operation, the list of available or pending calls will scroll from one location of a remote handset to the next, pausing long enough on each location so that the user be able to select that particular location, if desired. This display will appear on the upper portion of the LCD window and will consist of one phone at a time. In addition, the user has the option to override this auto-scrolling operation and manually scroll through the list by pressing the touch button labeled "REVIEW PENDING" 88 on the control panel 82. Thus, the "REVIEW PENDING" button allows the user to scroll to the subsequent handset locations on the list. If the buttons 86, 88, 90, 94 & 96 are left unattended for a particular period of time, auto-scrolling will resume. When a new call comes in, a buzzer is activated by the call alert buzzer 74 and will sound an audible sound until the operator acknowledges the call by pressing the acknowledge, i.e. "ACK" 90, or "CONNECT" buttons 86 on the control panel 82.

Figure 6:
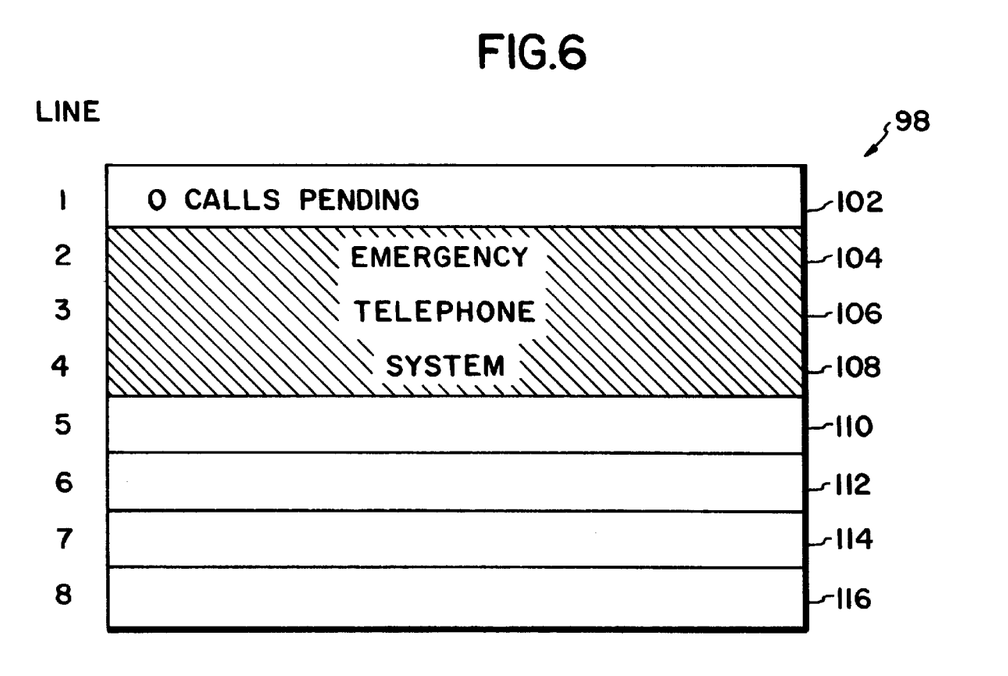
FIG. 6 is an enlarged view of the display of the control panel of FIG. 4 showing a preferred screen when no incoming calls are received by the phone control center module.

Referring to FIG. 6, there is shown the display 98 of the preferred embodiment when no calls are pending or connected to the phone control center module 26. The display 98 shows "0CALLS PENDING" at the top and "EMERGENCY TELEPHONE SYSTEM" across the middle of the display.

Figure 7:
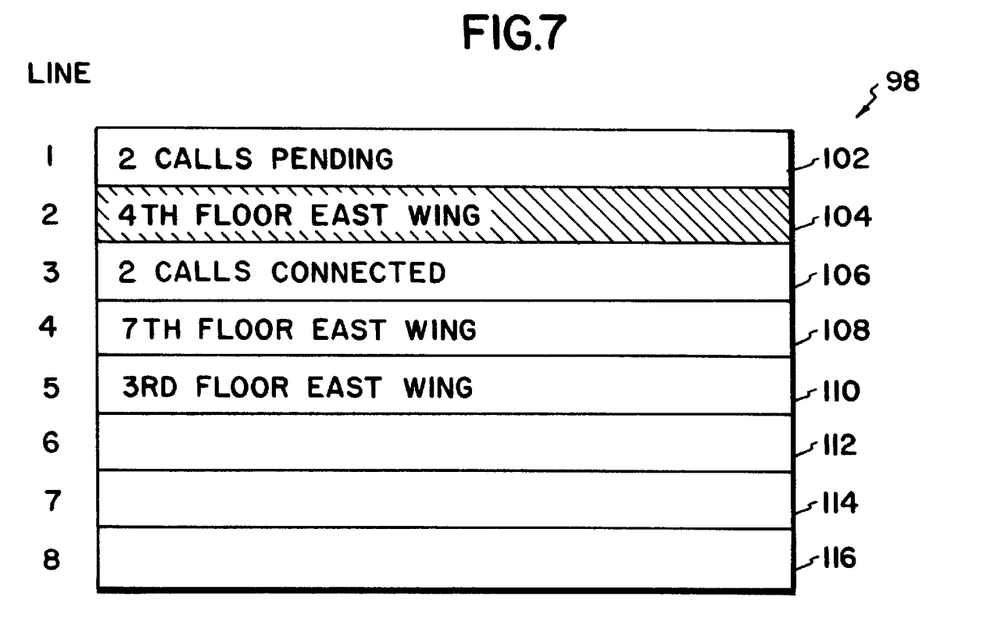
FIG. 7 is an enlarged view of the display of the control panel of FIG. 4 showing a sample screen when one of two pending calls is selected.

Referring to FIG. 7, there is shown an example of the display when two calls are pending and two calls have been connected. By pressing the "REVIEW PENDING" button 88, the display 98 will highlight the location shown on the second line 104, as shown in FIG. 7. By continually pressing the "REVIEW PENDING " button 88, the display 98 will scroll through each location of the pending calls list at the second line 104. By leaving the buttons 86, 88, 90, 94 & 96 unattended for a particular period of time, auto-scrolling will resume. Such calls will remain pending until they are connected by pressing the "CONNECT" button 86 or until the remote handset is ends the call. When the "CONNECT" button 86 is pressed, the selected pending call will then appear on one of the connected call lines 108, 110, 112, 114 or 116 by zone name using alpha-numeric characters. For example, in FIG. 7, the words "4TH FLOOR EAST WING" will be moved from the second line 104 to the sixth line 112 when the "CONNECT" button 86 is pressed.

Figure 8:
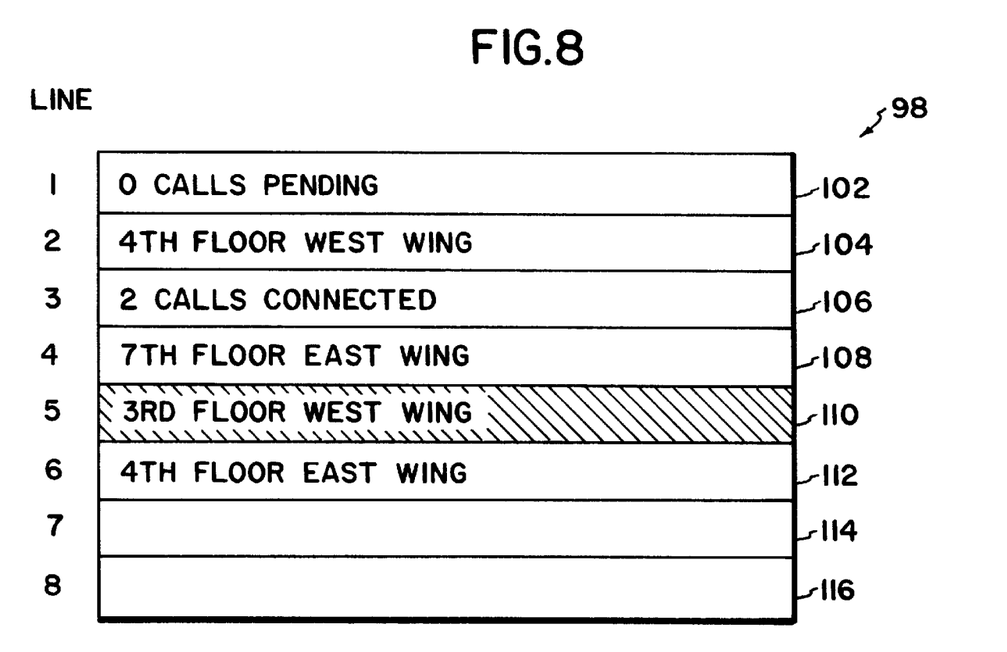
FIG. 8 is an enlarged view of the display of the control panel of FIG. 4 showing a sample screen when one of two connected calls is selected.

Referring to FIG. 8, there is shown an example of the display when no calls are pending and two calls have been connected. By pressing the "REVIEW CONNECTED" button 96, the display 98 will sequentially highlight the connected calls shown in the fourth through eighth lines 108, 110, 112, 114 & 116 of the display. For example, by pressing the "REVIEW CONNECTED" button 96 once, the highlighted portion of the display may move from the fourth line 108 to the fifth line 110, as shown in FIG. 8. After selecting a particular connected call, the user may press the "DISCONNECT" button 94 to move the currently selected call back to the pending list. Thus, for the display 98 shown in FIG. 8, the words "3RD FLOOR WEST WING" of the fifth line 110 will be moved to the second line 104 when the "DISCONNECT" button 94 is pressed.

Hanging up the central or master handset will automatically disconnect all connected calls. If after a particular time period after hanging up the handset, such as ten seconds, pending calls still exist, then the call buzzer resounds to alert the user.

The invention having been thus described with particular reference to the preferred forms thereof, it will be obvious that various changes and modifications may be made therein without departing from the spirit and scope of the invention as defined in the appended claims.

Wherefore, we claim:

1. A phone control system for a life safety network comprising:
   a panel arrangement having a local rail for receiving a plurality of control modules and for interconnecting said control modules, said control modules having means for transmitting and receiving inter-module data along said local rail;
   a voice communication line; a phone control center module, being one of said control modules connected to said local rail, having means for storing executable code, means for processing said executable code, input keys for receiving user input, an output screen for displaying alpha-numeric text output; a central handset for communication of voice messages along said voice communication line;
   a loop controller line; a loop controller module, being one of said control modules connected to said local rail, having means for storing executable code, means for processing said executable code, and a data line interface for receiving and transmitting loop controller signals along said loop controller line;
   remote means, remote from the panel arrangement, for transmitting and receiving said loop controller signals, said remote means being connected to both said loop controller line and said voice communication line, said remote means including a remote handset for communication of said voice messages along said voice communication line.

2. The phone control system of claim 1, wherein said central handset of said phone control center module includes a handset interface to connect to said central handset to said means for processing and said voice communication line.

3. The phone control system of claim 1, wherein said phone control center module includes an ASU interface for broadcasting said voice communication signals through a loudspeaker system.

4. The phone control system of claim 1, wherein said phone control center module includes a class B phone riser for connection to said voice communication line.

5. The phone control system of claim 1, wherein said phone control center module includes a class A return for connection to said voice communication line.

6. The phone control system of claim 1, wherein said phone control center module includes a constant current source for noise immunity.

7. The phone control system of claim 1, wherein said phone control center module includes an RS-485 interface for connection to said local rail.

8. The phone control system of claim 1, wherein said phone control center module includes a call alert buzzer for emitting an audible sound when a call is received by said control center module.

9. The phone control system of claim 8, wherein said input keys of said phone control center module include an acknowledge button for terminating said audible sound.

10. The phone control system of claim 1, wherein said output screen of said phone control center module includes a first section for displaying pending calls and a second section for displaying connected calls.

11. The phone control system of claim 10, wherein said first section of said output screen includes a status line for indicating the number of pending calls.

12. The phone control system of claim 10, wherein said first section of said output screen includes a pending call line for displaying pending calls sequentially.

13. The phone control system of claim 10, wherein said input keys of said control center module includes a review pending button for scrolling said pending calls through said pending call line and selecting a particular pending call of said pending calls.

14. The phone control system of claim 10, wherein said input keys of said control center module includes a connect button for transferring a particular pending call from said first section to said second section of said output screen.

15. The phone control system of claim 10, wherein said second section of said output screen includes a status line for indicating the number of connected calls.

16. The phone control system of claim 10, wherein said second section of said output screen includes a plurality of connected call lines for displaying calls connected to said central handset.

17. The phone control system of claim 16, wherein said plurality of connected call lines display calls connected to said central handset by zone name using alpha-numeric characters.

18. The phone control system of claim 10, wherein said input keys of said phone control center module includes a review connected button for selecting a particular connected call of said connected calls.

19. The phone control system of claim 10, wherein said input keys of said phone control center module includes a disconnect button for transferring a particular connected call from said second section to said first section of said output screen.

* * * * *